(12) United States Patent
Rogan et al.

(10) Patent No.: US 10,740,615 B2
(45) Date of Patent: Aug. 11, 2020

(54) MUTUAL AUGMENTED REALITY EXPERIENCE FOR USERS IN A NETWORK SYSTEM

(71) Applicant: Uber Technologies, Inc., San Francisco, CA (US)

(72) Inventors: Aaron Matthew Rogan, Westminister, CO (US); Wes Leung, San Francisco, CA (US); Nicolas Garcia Belmonte, San Francisco, CA (US); Ramik Sadana, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 16/197,243

(22) Filed: Nov. 20, 2018

(65) Prior Publication Data

US 2020/0160054 A1    May 21, 2020

(51) Int. Cl.
    *G06K 9/00*      (2006.01)
    *G06T 19/00*     (2011.01)
    (Continued)

(52) U.S. Cl.
    CPC ..... *G06K 9/00671* (2013.01); *G06K 9/00744* (2013.01); *G06K 9/3241* (2013.01); *G06T 19/006* (2013.01); *H04W 4/40* (2018.02)

(58) Field of Classification Search
    CPC .......................... G06K 9/00671; G06T 19/006
    (Continued)

(56) References Cited

U.S. PATENT DOCUMENTS 9,613,386 B1    4/2017    Arden et al.
10,126,138 B1   11/2018   Farmer et al.
(Continued)

FOREIGN PATENT DOCUMENTS

KR    10-2013-0112191 A    10/2013
KR    10-2015-0061101 A     6/2015
WO    WO 2014-201324 A1    12/2014

OTHER PUBLICATIONS

PCT International Search Report and Written Opinion, PCT Application No. PCT/IB2018/056377, dated Dec. 13, 2018, 11 pages.
(Continued)

*Primary Examiner* — Shivang I Patel
(74) *Attorney, Agent, or Firm* — Fenwick & West LLP

(57) ABSTRACT

A network system, such as a transport management system, generates a mutual augmented reality (AR) experience for a user and a provider associated with a service. Responsive to receiving a service request, a service management module matches the user with an available provider and monitors the location of the user and provider client devices as the user and provider travel to the pickup location. When the devices are within a threshold distance of each other, an image recognition module monitors live video streams on the devices for the vehicle and the user. Responsive to the vehicle and user entering the field of view of the devices, an AR control module selects computer-generated AR elements and instructs the devices to visually augment the video streams to identify the user and provider to each other and to allow the user and provider to communicate and share data with each other.

20 Claims, 5 Drawing Sheets

(51) Int. Cl.
*H04W 4/40* (2018.01)
*G06K 9/32* (2006.01)

(58) Field of Classification Search
USPC .......................................................... 345/633
See application file for complete search history.

(56) References Cited

U.S. PATENT DOCUMENTS

| | | |
|---|---|---|
| 2002/0075282 A1 | 6/2002 | Vetterli et al. |
| 2010/0250116 A1 | 9/2010 | Yamaguchi et al. |
| 2011/0153198 A1 | 6/2011 | Kokkas et al. |
| 2013/0132140 A1 | 5/2013 | Amin et al. |
| 2014/0067488 A1 | 3/2014 | James et al. |
| 2015/0332425 A1 | 11/2015 | Kalanick et al. |
| 2016/0370194 A1 | 12/2016 | Colijn et al. |
| 2017/0220966 A1 | 8/2017 | Wang |
| 2018/0075287 A1 | 3/2018 | Elswick |
| 2018/0174265 A1 | 6/2018 | Liu et al. |
| 2018/0189566 A1 | 7/2018 | Grimm et al. |
| 2018/0365893 A1* | 12/2018 | Mullins .............. G02B 27/0101 |
| 2019/0017839 A1* | 1/2019 | Eyler ................. G01C 21/3638 |

OTHER PUBLICATIONS

United States Office Action, U.S. Appl. No. 15/693,317, dated Mar. 29, 2019, 11 pages.
PCT International Search Report and Written Opinion, PCT Application No. PCT/IB2019/050612, dated Aug. 19, 2019, 11 pages.

* cited by examiner

MUTUAL AUGMENTED REALITY EXPERIENCE FOR USERS IN A NETWORK SYSTEM

BACKGROUND

The described embodiments generally relate to the field of network systems, and, more particularly, to generating mutual augmented reality experiences for users of a network system.

Network systems, such as transport management systems, provide support for logistical issues in managing the transportation of people, cargo, or the like. In some systems, a provider provides transportation services to a user to a location selected by the user. Typically, a user is informed only of a provider's name, vehicle type, and license plate and must rely on the received information to identify the provider's vehicle as it approaches the pickup location. However, a user may strain to read the license plate and identify the make and model of a vehicle to determine whether an approaching vehicle is the provider. Similarly, it may be difficult for a provider to identify a user, particularly in congested areas with significant foot traffic. This may lead to inefficiencies in the pickup process, particularly in densely populated pickup areas, and may cause frustration to the parties and delay the service.

SUMMARY

To enable a more efficient pickup experience for users (e.g., riders) and providers (e.g., drivers or autonomous vehicles), a network system creates a mutual augmented reality (AR) experience that allows a user and provider to identify each other and exchange messages and other data.

A service management module receives, through a user application, user input comprising a set of service data. In one embodiment, the service data includes at least an origin location, a request for a provider associated with the network system to transport the user from the origin location, and optionally, a destination location and a desired departure time. The origin location is a physical location over a threshold radius and/or with predetermined boundaries (e.g., San Francisco International Airport) and encompasses one or more pickup locations (e.g., a two meter-long stretch of curb where the provider stops and the user enters the vehicle).

Responsive to receiving the request for service, the service management module matches the user with one of a plurality of available providers and sends an invitation message to a provider client device inviting the provider to fulfill the request. If the provider accepts the invitation message, the service management module instructs a device monitoring module to monitor the locations of the user client device and provider client device as the user and provider travel to the pickup location.

The device monitoring module receives information from a location determination module on the user and provider client devices and notifies an image recognition module when the devices are within a threshold distance of each other or of the pickup location. The device monitoring module sends the devices locations to an image recognition module, which instructs the user client device and provider client device to initiate live video feeds. The image recognition module monitors the feeds and uses a trained model to predict a likelihood that an approaching vehicle is the provider's vehicle by calculating a vehicle score based in part on stored information regarding the provider and/or the provider's vehicle (e.g., the make, model, and color of the vehicle, the license plate state and number, the provider's name and/or photograph, etc.). Similarly, the image recognition module may monitor the video feed on the provider client device to identify the user and/or user client device based on stored data associated with the user (e.g., the user's photograph, if the user opts-in to sharing her photograph for this purpose) and/or location data received from the user client device.

Responsive to identifying the vehicle and/or user (and thus, the provider and user client devices) in the video feeds of the client devices, the image recognition module notifies an AR control module of the device locations and instructs the AR control module to initiate a mutual AR session on the devices. The AR control module generates computer-generated AR elements associated with the service and instructs an AR application to overlay the generated elements onto the display. For example, the AR elements might include an identification of the user, the provider, or a pickup point associated with the service and/or icons allowing the user and provider to initiate a conversation with each other, to share data (e.g., to make a payment), and/or to select additional AR elements to display on one or both of the devices.

DETAILED DESCRIPTION

The Figures and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
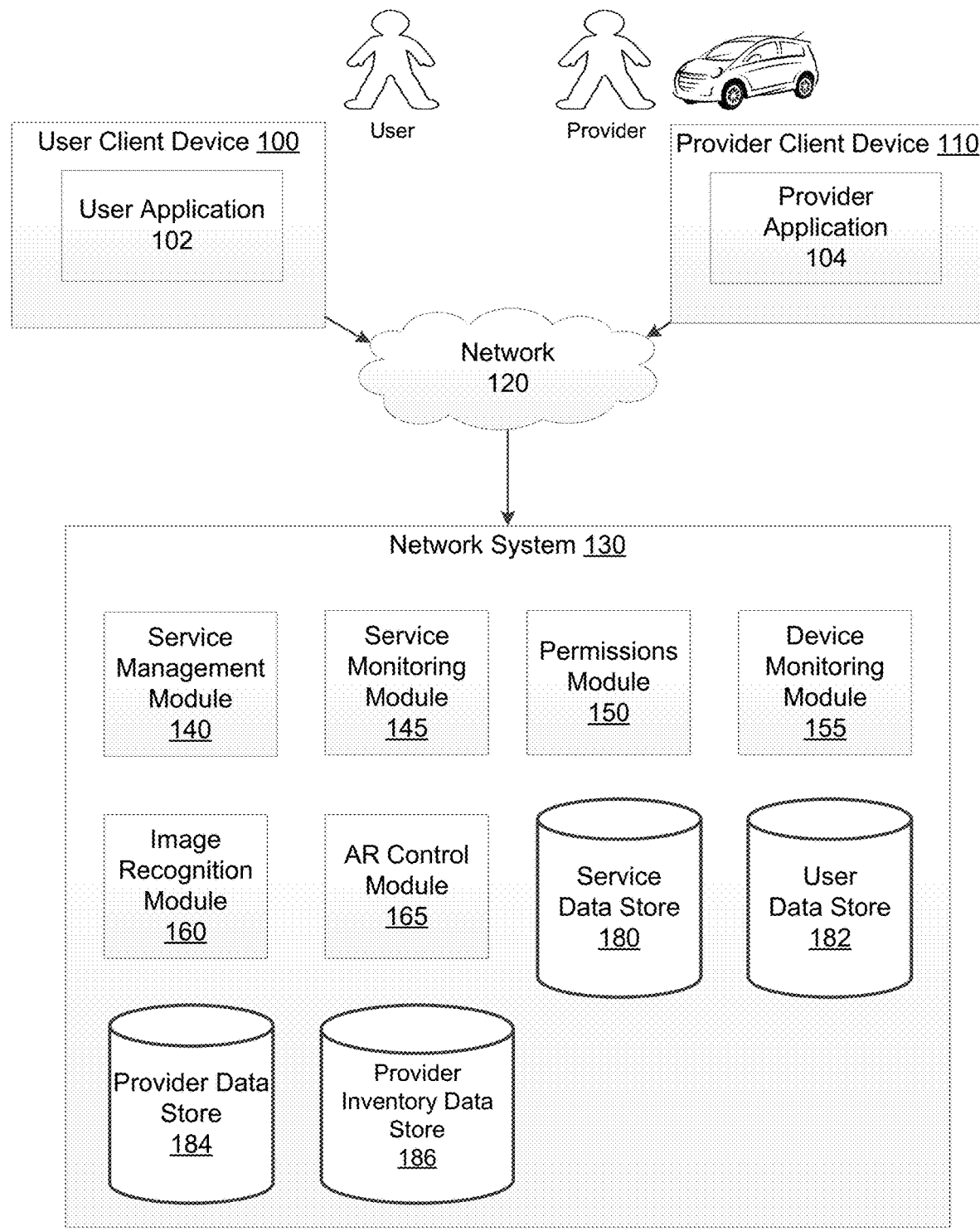
FIG. 1 illustrates the system environment for an example network system, in accordance with an embodiment.

Turning now to the specifics of the system architecture, FIG. 1 illustrates a system environment for an example network system 130. In the example of FIG. 1, the network system 130 coordinates the transportation of persons and/or goods/items for a user (e.g., such as a rider) by a service provider (e.g., a driver of a vehicle or an autonomous vehicle). The provider uses a vehicle to provide the transportation to the user. In this example embodiment, the network system 130 includes a service management module 140, a service monitoring module 145, a permissions module 150, a device monitoring module 155, an image recognition module 160, and an AR control module 165, and various data stores including a service data store 180, a user data store 182, a provider data store 184, and a provider inventory data store 186. These modules and data stores are not native components of a generic computer system, and provide structures and functions beyond generic functions of a computer system, as further described below.

A user operates a client device 100 that executes a user application 102 that communicates with the network system 130. The user operates the user application 102 to view information about the network service 130, and to make a request for service from the network system 130 for a delivery or transport service ("a service") of the user (and, optionally, additional persons) and/or items, for example cargo needing transport. The user application enables the user to specify an origin location and/or a destination location associated with the service. An origin location and/or destination location may be a location input by the user or may correspond to the current location of the user client device 100 as determined automatically by a location determination module (not shown) in the user client device 100, e.g., a global positioning system (GPS) component, a wireless networking system, or a combination thereof. For purposes of simplicity, as described herein, an origin location can include a pickup location for service (i) determined by the user application 102 (e.g., based on the current location of the user client device 100 using a GPS component), (ii) specified or selected by the user, or (iii) determined by the network system 130.

According to examples herein, the user client device 100 can transmit a set of data (e.g., referred to herein as "service data") to the network system 130 over the network(s) 120 in response to user input or operation of the user application 102. Such service data can be indicative of the user's interest in potentially requesting service (e.g., before actually confirming or requesting the service). For example, the user may launch the user application 102 and specify an origin location and/or a destination location to view information about the network service before making a decision on whether to request service. The user may want to view information about the average or estimated time of arrival for pick up by a provider, the estimated time to the destination, the price, the available service types, etc. Depending on implementation, the service data can include the origin and/or destination location information, user information (e.g., identifier), application information (e.g., version number), device identifier or type, etc. According to some examples, each time the user modifies the origin and/or destination location, the user application 102 can generate and transmit the service data to the network system 130.

Once the user confirms or orders a service via the user application 102, the user application 102 can generate data corresponding to a request for the service through the network system 130 (e.g., also referred to herein as a "service request"). Responsive to receiving a service request, the network system 130 uses information from the service request to match the user with one of a plurality of available providers. Depending on implementation, the service request can include user or device information (e.g., a user identifier, a device identifier), a service type (e.g., vehicle type) and/or an origin location, a destination location, a payment profile identifier, and/or other data. The network system 130 selects a provider from a set of providers, such as based on the provider's current location and status (e.g., offline, online, available, etc.) and/or information from the service request (e.g., service type, origin location, and/or destination location), to provide the service for the user and transport the user from the origin location to the destination location. Responsive to selecting an available provider, the network system 130 sends an invitation message to the provider client device 110 inviting the provider to fulfill the service request.

The provider operates a client device 110 executing a provider application 104 that communicates with the network system 130 to provide information indicating whether the provider is available or unavailable to provide transportation services to users. The provider application 104 can also present information about the network system 130 to the provider, such as invitations to provide service, navigation instructions, map data, etc. In one embodiment, the provider application 104 enables the provider to provide information regarding availability of the provider by logging into the network system 130 and activating a setting indicating that they are currently available to provide service. The provider application 104 also provides the current location of the provider or the provider client device 110 to the network system 130. Depending on implementation, the current location may be a location input by the provider or may correspond to the current location of the provider client device 110 as determined automatically by a location determination module (not shown) in the provider client device 110 (e.g., a GPS component, a wireless networking system, or a combination thereof. The provider application 104 further allows a provider to receive, from the service management module 140, an invitation message to provide a service for a requesting user, and if the provider accepts via input, the provider application 104 can transmit an acceptance message to the service management module 140. The service management module 140 can subsequently provide information about the provider to the user application 102. As another embodiment, the provider application 104 can enable the provider to view a list of current service requests and to select a particular service request to fulfill. The provider application 104 can also receive routing information from the service management module 140. The provider application 104 enables a provider to provide a rating for a user upon completion of a service. In one embodiment, the rating is provided on a scale of one to five, five being the maximal (best) rating.

The user client device 100 and the provider client device 110 are portable electronic devices such as smartphones, tablet devices, wearable computing devices (e.g., smartwatches) or similar devices. Alternatively, the provider client device 110 can correspond to an on-board computing system of a vehicle. Client devices typically have one or more processors, memory, touch screen displays, wireless networking system (e.g., IEEE 802.11), cellular telephony support (e.g., LTE/GSM/UMTS/CDMA/HSDPA, etc.), and location determination capabilities. In one embodiment, the provider client device 110 is mounted (e.g., on the dashboard or windshield) in the provider's vehicle. Alternatively, the provider client device 110 may be associated with a heads-up display unit that displays AR elements in the provider's line of sight.

The user client device 100 and the provider client device 110 can visually augment captured video streams and/or images using AR. AR augments views of a physical, real-world environment with computer-generated elements (e.g., images, video, text, graphics, etc.). The client devices 100 and 110 use an inertial measuring unit (IMU) to measure the velocity, orientation, and gravitational forces on the client devices 100 and 110. In one embodiment, AR functionality is executed via an AR application on the client devices 100 and 110. The AR application can be a standalone application on the client devices 100 and 110 or a plug-in to the user application 102 and provider application 104. In other embodiments, a head-mounted display (HMD) is connected to the client devices 100 and 110 via a wireless communication protocol such as Bluetooth and is used to display the AR video stream and/or images.

The user client device 100 and the provider client device 110 interact with the network system 130 through client applications configured to interact with the network system 130. The applications 102 and 104 of the user client device 100 and the provider client device 110, respectively, can present information received from the network system 130 on a user interface, such as a map of the geographic region, and the current location of the user client device 100 or the provider client device 110. The applications 102 and 104 running on the user client device 100 and the provider client device 110 can determine the current location of the device and provide the current location to the network system 130.

The service management module 140 is configured as a communicative interface between the user application 102, the provider application 104, and the various modules and data stores in the network system 130, and is one means for performing this function. The service management module 140 is configured to receive provider availability status information and current location information from the provider application 104 and update the provider inventory data store 186 with the availability status. The service management module 140 is also configured to receive service requests from the user application 102 and creates corresponding service records in the service data store 180. According to an example, a service record corresponding to a service request can include or be associated with a service ID, a user ID, an origin location, a destination location, a service type, pricing information, and/or a status indicating that the corresponding service request has not been processed. According to one example, when a provider accepts the invitation message to service the service request for the user, the service record can be updated with the provider's information as well as the provider's location and the time when the service request was accepted. Similarly, location and time information about the service as well as the cost for the service can be associated with the service record.

In one embodiment, during the service, the service monitoring module 145 receives information (e.g., periodically) from a location determination module (not shown) on the provider client device 110 indicating the location of the provider's vehicle and/or telematics information (e.g., indications of current speed, acceleration/deceleration, events, stops, and so forth). The service monitoring module 145 stores the information in the service data store 180 and can associate the information with the service record. In some embodiments, the service monitoring module 145 periodically calculates the provider's estimated time of arrival ("PETA") at the pickup location and provides the PETA to the user application 102.

The permissions module 150 maintains user-specified settings for sharing location data of users of the network system 130. Users of client devices 100 and 110 may opt-in to sharing device location data with the network system 130 for the purpose of generating AR elements associated with a service on the client devices 100 and 110 (e.g., identifying the pickup and/or destination location using a pin or other marker) and/or may consent to participating in mutual AR experiences with other users (e.g., providers and/or users) of the network system 130. For example, a user may provide a photograph of herself and may opt-in to use of her photograph in the mutual AR experience (e.g., to allow the image recognition module 160 to identify the user). In some embodiments, the permissions module 150 queries users through the client devices 100 and 110 to allow the user to opt-in to one or more location sharing features. For example, a user might consent to sharing her location with a provider assigned to the user's service request, but might not want to share her location with other users. Responsive to receiving the user-specified location sharing settings, the permissions module 150 sends the settings to the user data store 182 and the provider data store 184 for storage.

If the user and provider associated with a service have consented to location sharing, the permissions module 150 instructs the device monitoring module 155 to monitor the locations of the client devices 100 and 110 as they travel from the user and provider's current locations to the pickup location. The device monitoring module 155 receives location data for the provider client device 110 from the service monitoring module 145 and for the user client device 100 from a location determination module (not shown) on the user client device 100 (e.g., a GPS component, a wireless networking system, or a combination thereof), and compares the locations of the devices 100 and 110 to determine when the devices 100 and 110 are within a threshold distance of each other (e.g., as the user and the provider approach the pickup location).

Additionally or alternatively, users of the network system 130 may consent to device communication with other users (e.g., users or providers) using radio signals such as Wi-Fi or Bluetooth signals. For example, the provider client device 110 might transmit a Bluetooth signal comprising a unique beacon ID. If a user client device 100 located at or near the pickup location is within range of the transmitted signal, the user client device 100 reports the received beacon ID to the device monitoring module 155, which detects the beacon ID as associated with the provider client device 110 and monitors the location of the provider client device 110 as it approaches the pickup location (i.e., as the signal strength increases). Similarly, the provider client device 110 may report a detected beacon ID to the device monitoring module 155, which identifies the beacon ID as associated with the user client device 100 and monitors the location of the user client device 100 relative to the provider client device 110 based on the signal strength of the received signal. In other embodiments, the device monitoring module 155 sends the beacon IDs to the user client device 100 and provider client device 110 such that the user client device 100 and provider client device 110 recognize the beacon ID associated with the other device when the devices are within a threshold distance of each other.

Responsive to determining that the user client device 100 and the provider client device 110 are within a threshold distance of each other and/or that the received signal strength (RSS) of the radio signals detected by the devices 100 and 110 exceeds a signal strength threshold, the device monitoring module 155 sends the device location data, along with the approximate speed of the vehicle, to the image recognition module 160 to identify the vehicle and/or the user client device 100 in the field of view of the devices 100 and 110.

The image recognition module 160 instructs the user client device 100 and provider client device 110 to initiate a live video feed using the camera on each of the devices 100 and 110 and to begin displaying the captured feed on the display. The image recognition module 160 queries the provider data store 184 for identifying information associated with the provider and/or vehicle. In one embodiment, the identifying information includes one or more of the year, make, model, license plate number or license plate state of the provider's vehicle, the presence or absence of trade dress associated with the network system 130 on the vehicle, or the provider's name, photograph, or rating. In some embodiments, the information further includes a designation of whether the provider is associated with an indication device that is capable of providing illumination, displaying content, and/or outputting audio and that can be positioned or fashioned on or within the provider's vehicle. Using an indication device to identify a provider based on a specified output configuration is described further in U.S. patent application Ser. No. 14/604,573, filed on Jan. 23, 2015; U.S. patent application Ser. No. 15/342,072, filed on Nov. 2, 2016; U.S. patent application Ser. No. 15/615,678, filed on Jun. 6, 2017; and PCT Application No. PCT/US15/14406, filed on Feb. 4, 2015, which are hereby incorporated by reference in their entirety.

The provider data store 184 returns the requested identifying information to the image recognition module 160, which monitors the live video feed on the user client device 100 to identify the vehicle as it enters the line of sight of the user client device 100. In one embodiment, the image recognition module 160 uses machine learning techniques to train a model that when applied to an approaching vehicle in the live video feed on the user client device 100 outputs a score indicating a probability that the approaching vehicle is the provider's vehicle. The image recognition module 160 trains the model using training data, which may include dense and/or sparse features. In one embodiment, the image recognition module 160 forms a training set of data by identifying a positive set of vehicle identification instances in which an approaching vehicle was identified as the provider's vehicle. In some embodiments, the image recognition module 160 also trains a negative set of content items for which an approaching vehicle was identified as not belonging to the provider.

The image recognition module 160 extracts feature values from the training data, the features being variables deemed potentially relevant to whether a live video feed includes the provider's vehicle. The feature values extracted by the image recognition module 160 may represent a pixel or an object in the feed. Examples of feature values include color, length, area, shapes, edges, gradient magnitude, and gradient direction. An ordered list of the features for the feed is herein referred to as the feature vector for the feed. In one embodiment, the image recognition module 160 applies dimensionality reduction (e.g., via linear discriminant analysis (LDA), principle component analysis (PCA), or the like) to reduce the amount of data in the feature vectors to a smaller, more representative set of data.

In one embodiment. the image recognition module 160 uses supervised machine learning techniques to train the model with the feature vectors of the positive and negative training sets serving as the inputs. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments. The model, when applied to the feature vector extracted from a video feed, outputs an indication of whether the feed contains the provider vehicle. In one embodiment, the model determines a vehicle score, for example based on the make, model, or color of an approaching vehicle and/or the license plate state and number. In some embodiments, the vehicle score is also based on the presence or absence of trade dress associated with the network system and/or illumination of an indication device on the provider's vehicle.

For example, an approaching vehicle might receive a high vehicle score if the make, model, and color of the vehicle match the provider information and the image recognition module 160 determines that the license plate state and number of the approaching vehicle match the license plate state and number of the provider's vehicle. Conversely, an approaching vehicle might receive a low score if the approaching vehicle is a different color and has a different license plate state and number than the provider's vehicle, even if the approaching vehicle is the same make and model and has trade dress associated with the network system. In some embodiments, the model also compares the current time with the PETA at the pickup location to determine the vehicle score. For example, if the PETA at the pickup location is three minutes from the current time, the model with assign a lower vehicle score than if the PETA were less than a minute. Responsive to determining that the vehicle score for an approaching vehicle exceeds a vehicle score threshold, the image recognition module 160 identifies the vehicle as the provider's vehicle and notifies the AR control module 165 of the vehicle location. Once the vehicle is identified as associated with the provider, the user can get into the vehicle to begin the service.

The image recognition module 160 may similarly identify the user client device 100 by monitoring the live video feed on the provider client device 110. For example, in one embodiment, the image recognition module 160 queries the user data store 182 for a photograph associated with the user and applies a trained model to predict a likelihood that an individual located at or within a threshold distance of the pickup location is the user. Additionally or alternatively, the image recognition module 160 may identify the user client device 100 in the live video feed on the provider client device 110 based on location data shared by the user client device 100.

In an alternative embodiment, identification of the provider and/or the user may be performed using localization tools, for example 2D-to-3D matching, as described in "Improving Image-Based Localization by Active Correspondence Search," by Torsten Sattler, Bastian Leibe, and Leif Kobbelt, or 3D-to-3D matching, as described in "*SegMatch*: Segment based loop-closure for 3D point clouds," by Renaud Dubé, Daniel Dugas, Elena Stumm, Juan Nieto, Roland Siegwart, and Cesar Cadena, both of which are hereby incorporated by reference in their entirety.

In embodiments in which both the user and the provider have consented to participate in the mutual AR session, the image recognition module 160 notifies the AR control module 165 of the locations of the user client device 100 and the provider client device 110 and instructs the AR control module 165 to initiate the mutual AR session on the devices 100 and 110. Alternatively, the image recognition module 160 instructs the AR control module 165 to initiate the mutual AR session responsive to identifying the pickup location in the field of view of the provider client device 110.

The AR control module 165 is responsible for generating computer-generated AR elements (e.g., images, video, graphics, text, etc.) to display on the user client device 100 and the provider client device 110 based on the geographic location, camera direction, and tilt of the devices 100 and 110, as determined by the IMU. For example, the camera direction and tilt can be used to determine whether the direction and angle at which the camera on the user client device 100 is pointing would capture an image that included the vehicle and should thus be augmented by associated AR elements. Using AR to identify an approaching vehicle as the provider is further described in U.S. patent application Ser. No. 16/020,118, filed Jun. 27, 2018, which is hereby incorporated by reference in its entirety. In some embodiments, the AR elements include audio navigation instructions.

In some embodiments, the display can include AR elements that identify the pickup location on the displays of the client devices 100 and 110 and/or direct the user and/or provider to the pickup location. For example, if the AR control module 165 determines that the pickup location is not within the field of view of the user client device 100, the AR control module 165 might overlay text and/or navigational elements directing the user to the pickup location (e.g., text reading "The pickup location is 50 feet to your right" or an arrow pointing to the right with text reading "20 meters"). Similarly, in embodiments where more than one user is associated with a single service, the AR control module 165 might overlay AR elements on each of the user client devices 100 allowing the users to select and/or navigate to a meeting point. Using AR to navigate a user to a pickup location is further described in U.S. patent application Ser. No. 15/693,317, filed Aug. 31, 2017, which is hereby incorporated by reference in its entirety.

The AR control module 165 allows the user and the provider to communicate and share AR elements during the mutual AR session. For example, the user and provider may exchange messages through a chat interface on the user application 102 and provider application 104 (e.g., to arrange a new pickup location if the assigned pickup location is in a congested area, to notify the provider if the user is delayed in traveling to the pickup location, etc.) and/or may provide user input through the user application 102 or provider application 104 to send AR elements to the other party and/or to request additional AR elements to be displayed on the user's own device. For example, a user might send an instruction for the AR control module 165 to display on the provider client device 110 a flag or other marker indicating the user's location. As another example, if the user is unable to locate the pickup location, the user can provide input requesting that the AR control module 165 highlight or otherwise identify the pickup location on the user client device 110. In still another example, if the client device 100 is associated with a recipient of a courier service, and the client device 110 is associated with a courier, the user of the client device 100 might provide input requesting display of an AR element on the client device 110 identifying a delivery location for the courier service.

In embodiments where only one of the user or provider has consented to location sharing for the purpose of generating service-related AR elements, the AR control module 165 displays AR elements associated with the consenting user. For example, if the provider has consented to sharing her location with the network system 130 for AR purposes, the AR control module 165 might use the location of the provider client device 110 to highlight or otherwise identify the pickup location on the provider client device 110. Conversely, if the user has consented only to receiving AR elements, but not to sharing his location, the AR control module 165 might augment the display of the user client device 100 with AR elements identifying the provider's vehicle as it approaches the pickup location (e.g., via a flag, highlighting, or text overlay). Similarly, in instances where an autonomous vehicle is selected to service the service request, the AR control module 165 provides for display AR elements on the user client device 100 only (e.g., elements identifying the pickup location and/or the vehicle).

The service data store 180 maintains a record of each in-progress and completed service coordinated by the network system 130. More specifically, each service provided by a provider to a user is characterized by a set of attributes (or variables), which together form a service record that is stored in the service data store 180. The attributes describe aspects of the provider, the user, and the service. In one embodiment, each service record includes a service identifier (ID), a user ID, a provider ID, the origin location, the pickup location, the destination location, the duration of the service, the service type for the service, estimated time of pick up, actual time of pickup, and provider rating by user, user rating by provider, price information, market information, and/or other environmental variables as described below. The variables for the service record are thus drawn from multiple sources, including the user's master and usage records in the user data store 182, the provider's master and operational records in the provider data store 184, and specific variables captured and received during each service.

The provider data store 184 stores account and operational information for each provider who participates in the network system 130. For each provider, the provider data store 184 stores one or more database records associated with the provider, including both master data and usage data. In some examples, master data for a provider includes the provider's name, provider's photograph, provider's license information, insurance information, provider vehicle information (year, make, model, vehicle ID, license plate), address information, cell phone number, payment information (e.g., credit card number), sign-up date, provider service type (regular, luxury, van, etc.), device type (e.g., type of cell phone), platform type (e.g., iOS, Android), application ID, and/or application version for the provider application 104). In some embodiments, the database record for a provider further includes a designation of whether the provider is associated with an indication device and/or a beacon ID associated with the provider client device 110.

The provider inventory data store 186 stores provider availability status information received from the service management module 140, including whether the provider is available for matching and the location of the provider (which gets updated periodically). When the service management module 140 receives a service request, the service management module 140 determines, from the provider inventory data store 186, which providers are potential candidates to pick up the user for the newly created service. When the network system 130 marks a service record as complete, the network system 130 can add the provider back into the inventory of available providers in the provider inventory data store 186).

Figure 2:
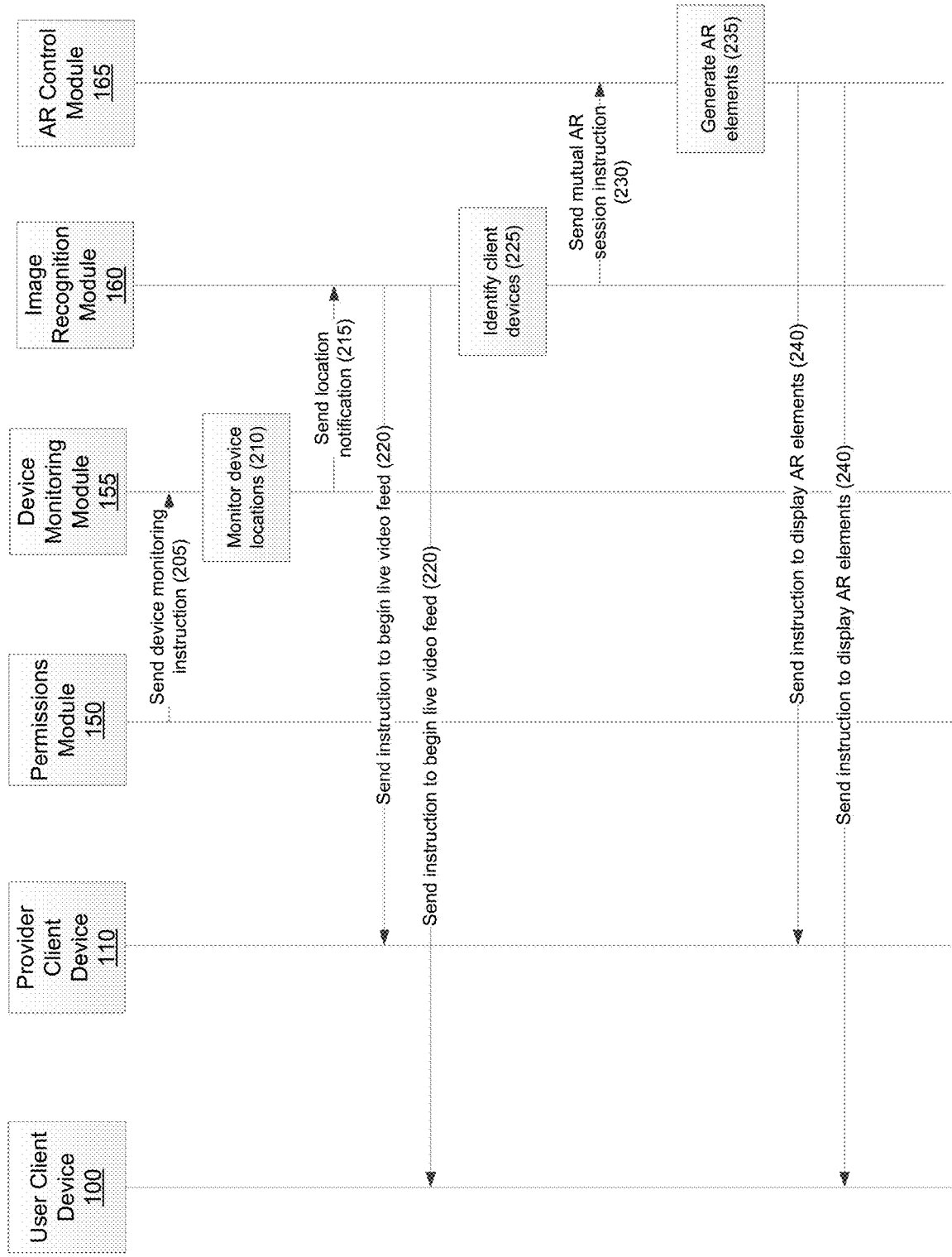
FIG. 2 is an interaction diagram for providing mutual AR elements to users of the network system, in accordance with an embodiment.

FIG. 2 is an interaction diagram for generating mutual augmented reality experiences for users of a network system, in accordance with an embodiment. A user submits a service request through the user application 102 for a service from a pickup location to a destination location. The pickup location may be a location inputted by the user or may correspond to the current location of the user client device 100. The service management module 140 receives the service request and uses information from the service request to match the user with one of a plurality of available providers.

Responsive to the provider accepting an invitation message from the service management module 140 to fulfill the service request, the service management module 140 queries the permissions module 150 to determine whether the user and provider have consented to joining mutual AR sessions associated with services facilitated by the network system 130. Responsive to determining that the user and provider have previously consented to participating in mutual AR sessions (or, responsive to querying the user client device 100 and/or provider client device 110 and receiving such authorization), the permissions module 150 instructs 205 the device monitoring module 155 to monitor the locations of the user client device 100 and the provider client device 110 as they travel from their current locations to the pickup location. The device monitoring module 155 uses a location determination module to monitor 210 the location of the user client device 100 and receives location data and, optionally, telematics information (e.g., indications of current speed) for the provider client device 110 from the service monitoring module 145. Additionally or alternatively, the device monitoring module 155 may monitor the locations of the client devices 100 and 110 based on the RSS of radio signals transmitted by the client devices 100 and 110.

Responsive to determining that the user client device 100 and the provider client device 110 are within a threshold distance of each other and/or that the RSS of the radio signals exchanged by the devices 100 and 110 exceeds a signal strength threshold, the device monitoring module 155 sends the device location data, along with an approximate speed of the vehicle associated with the provider client device 110, to the image recognition module 160 and instructs 215 the image recognition module 160 to identify the vehicle and/or the user client device 100 in the field of view of the devices 100 and 110.

The image recognition module 160 instructs 220 the user client device 100 and the provider client device 110 to initiate a live video feed using the cameras on the devices 100 and 110 and to begin displaying the captured feed on the display. The image recognition module 160 monitors the live video feeds and identifies 220 the vehicle as it enters the line of sight of the user client device 100. In one embodiment, the image recognition module 160 uses machine learning techniques to train a model configured to predict a likelihood that an approaching vehicle is the provider, as discussed above with respect to FIG. 1. Responsive to determining that a vehicle score output by the model exceeds a vehicle score threshold (e.g., if the license plate state and number for an approaching vehicle match stored data associated with the provider), the image recognition module 160 identifies the vehicle as the provider. In some embodiments, the image recognition module 160 similarly identifies the user and/or user client device 100 in the live video feed of the provider client device 110 based on stored profile data for the user.

In embodiments where both the user and provider have consented to participating in a mutual AR session, the image recognition module 160 notifies 225 the AR control module 165 of the locations of the devices 100 and 110 and instructs the AR control module 165 to initiate the mutual AR session by sending for display on the devices 100 and 110 AR elements associated with the service. The AR control module 165 generates 235 AR elements to display on the user client device 100 and provider client device 110 based on the geographic location, camera direction, and tilt of the devices 100 and 110 as well as, optionally, the RSS of radio signals exchanged between the devices 100 and 110 and sends 240 the AR elements to the devices 100 and 110. For example, the AR control module 165 might send for display on the user client device 100 graphical and/or textual AR elements identifying the provider's vehicle and might send for display on the provider client device 110 AR elements identifying the user and/or pickup location. As another example, if both the user and user are associated with an indication device, the AR elements might include a graphical representation of the indication device based on the user-specified output configuration.

In some embodiments, the mutual AR session includes AR elements allowing the user and/or provider to initiate a conversation with the other user and/or exchange other data through the applications 102 and 104. The user and provider may send each other messages, make payments, and/or instruct the AR control module 165 to send AR elements for display on the other user's device or request additional AR elements displayed on the user's own device. For example, the user might provide input through the user application 102 instructing the AR control module 165 to send for display a flag or other indication of the user's location to allow the provider to identify the user.

Figure 3:
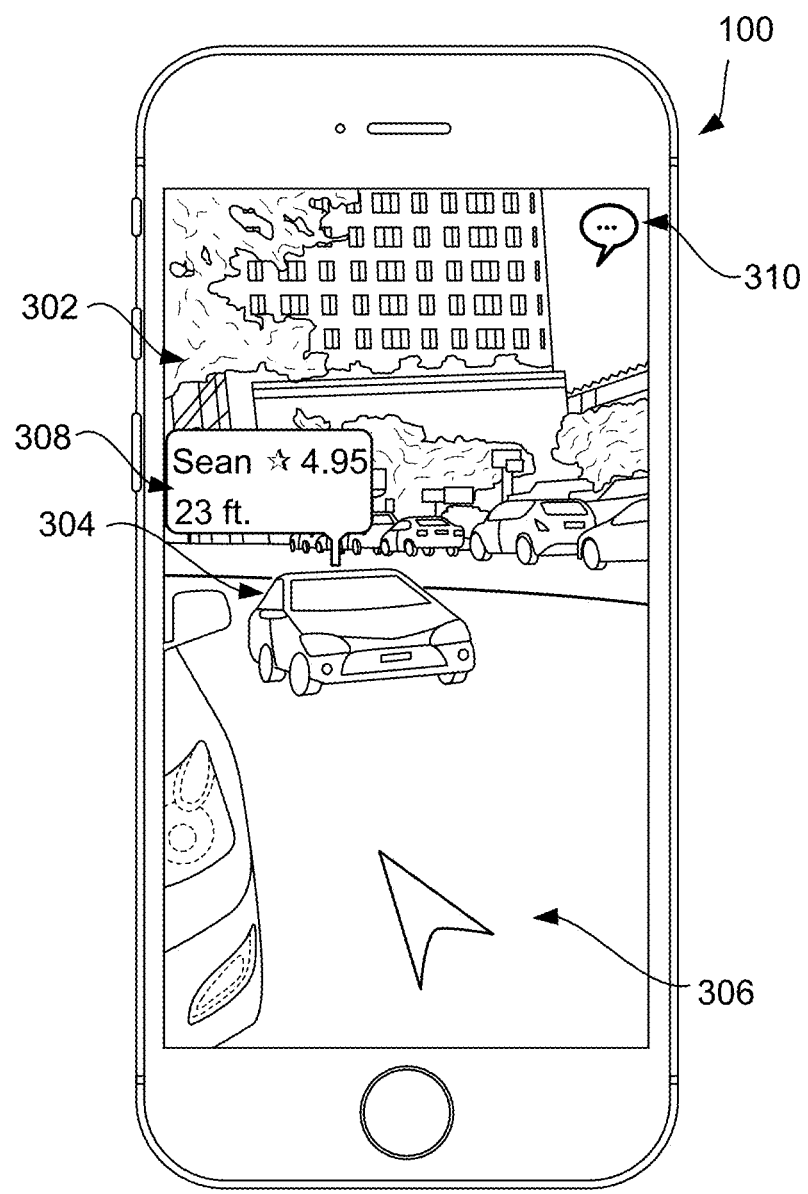
FIG. 3 illustrates an example image captured by a user client device and augmented with AR elements, in accordance with an embodiment.

FIG. 3 illustrates an example image captured by the user client device 100 and augmented with AR elements, in accordance with an embodiment. Using the geographic location, camera direction, and tilt of the user client device 100, the AR control module 165 selects computer-generated AR elements to display on the user client device 100. In the captured image 302, the user client device 100 displays an image of a road including a vehicle 304 approaching the location of the user client device 100. The captured image 302 is overlaid with graphical and textual elements intended to identify the vehicle as the provider, including an arrow 306 pointing to the vehicle and a text box 308 including the provider's name and rating. In various embodiments, the text box 308 displays different information about the provider based on provider-specified settings (i.e., the information that the provider has consented to sharing for purposes of the mutual AR experience). The AR elements further include a chat icon 310, the selection of which launches a chat interface in the in the user application 102 allowing the user to initiate a conversation and/or share data with the provider client device 110.

In other embodiments, the AR elements might include additional information identifying the provider, such as the provider's photograph, vehicle information, and/or a graphical representation of a personalized output configuration of an indication device. For example, if a user-specified configuration consisted of a blinking green light, the AR control module 165 might instruct the AR application to display a blinking green light on the provider's vehicle as it approached the pickup location.

Figure 4:
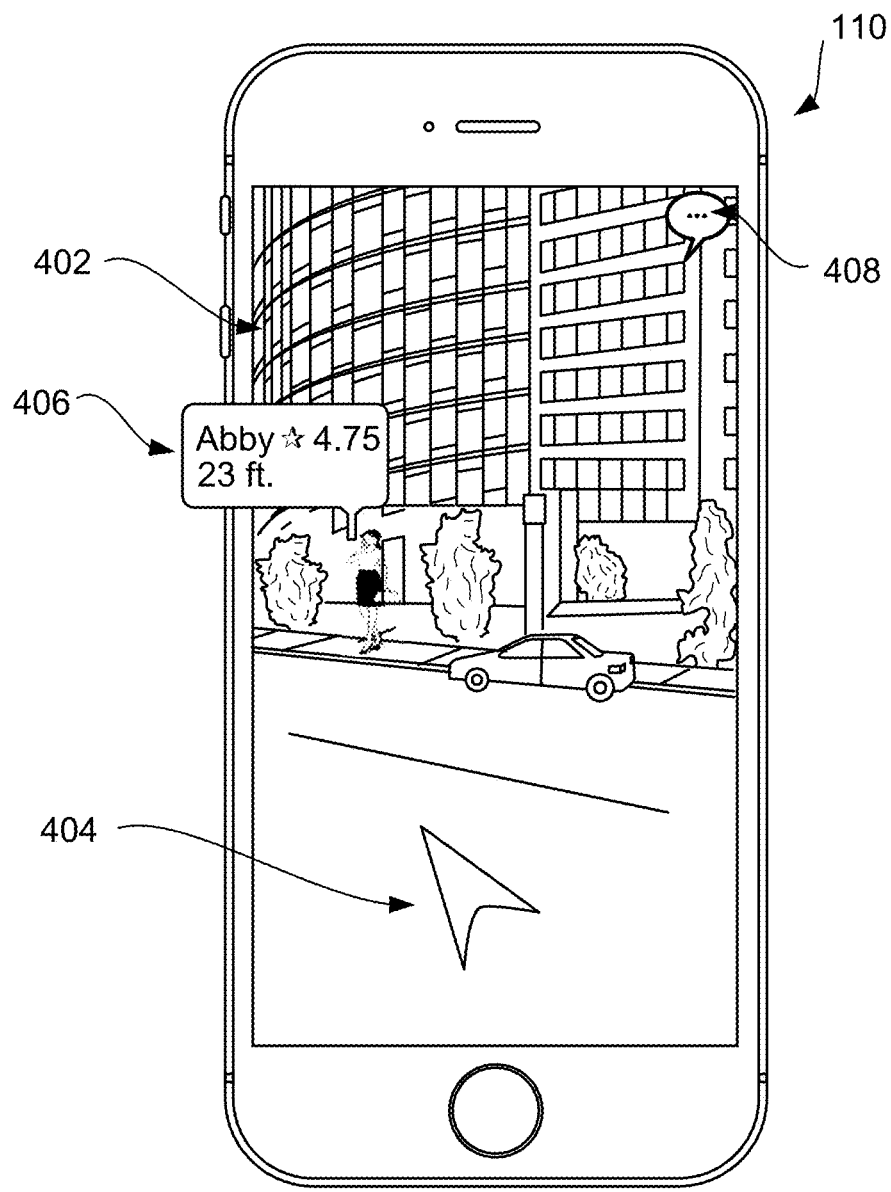
FIG. 4 illustrates an example image captured by a provider client device and augmented with AR elements, in accordance with an embodiment.

FIG. 4 an example image captured by the provider client device 110 and augmented with AR elements, in accordance with an embodiment. In one embodiment, the provider client device 110 is mounted (e.g., on the dashboard or windshield) in the provider's vehicle. Alternatively, the provider client device 110 may be associated with a heads-up display unit that displays AR elements in the provider's line of sight.

Using the geographic location, camera direction, and tilt of the provider client device 110, the AR control module 165 selects computer-generated AR elements to display on the provider client device 110. In the captured image 402, the provider client device 110 displays an image of a road approaching a pickup location associated with a service. The captured image 402 is overlaid with graphical and textual elements identifying the user and the pickup location. For example, the captured image 402 includes an arrow 404 pointing to the user and a text box 406 including the user's name and rating. In various embodiments, the text box 406 displays different information about the user based on user-specified settings (i.e., the information that the user has consented to sharing for purposes of the mutual AR experience). Identifying the user using AR elements allows the provider to stop at the correct location to pick up the correct user. The AR elements further include a chat icon 408, the selection of which launches a chat interface in the provider application 104 allowing the provider to initiate a conversation and/or share data with the user client device 100.

Figure 5:
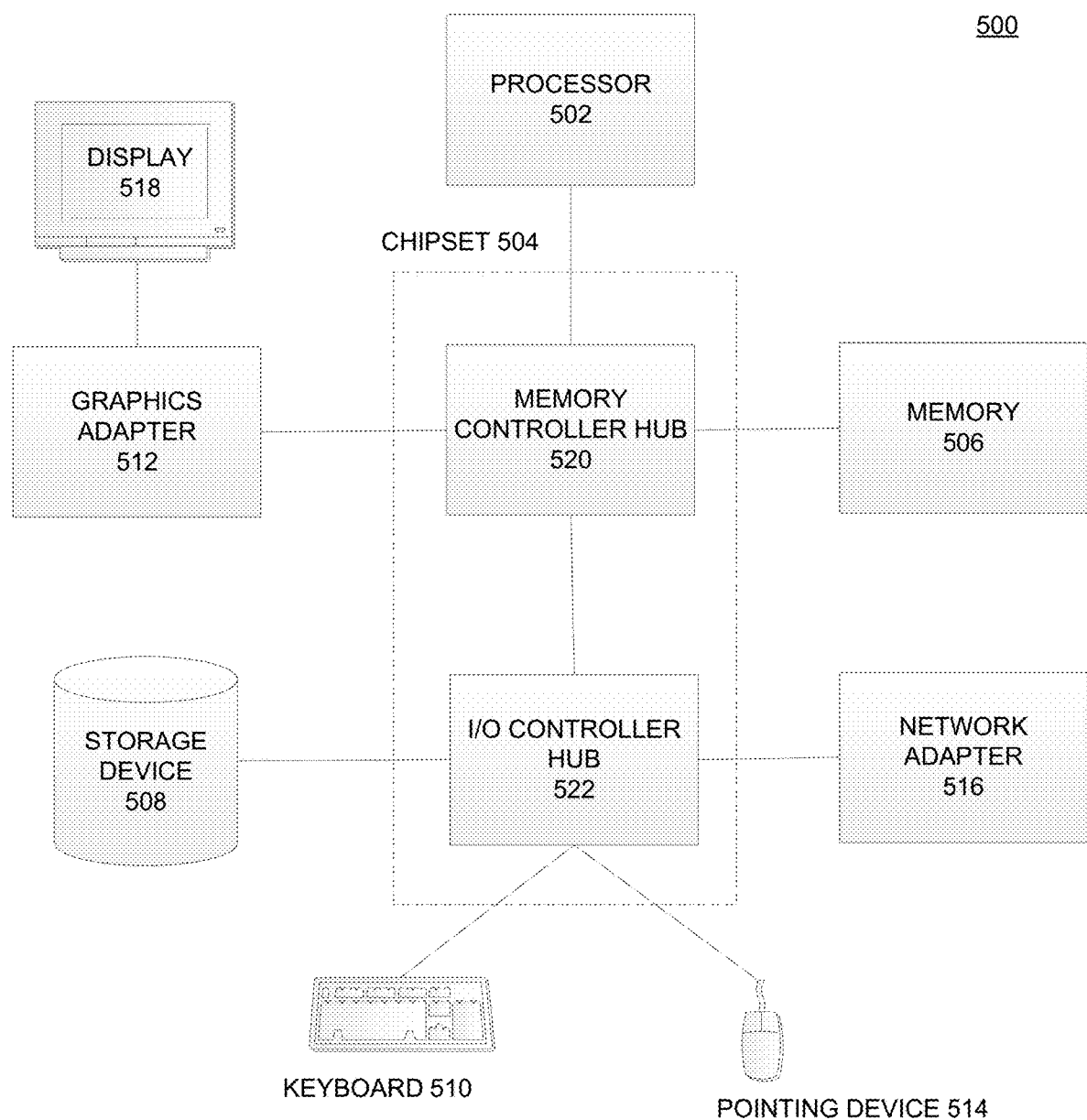
FIG. 5 illustrates example components of a computer used as part or all of the network system, the user client device, and/or the provider client device, in accordance with an embodiment.

FIG. 5 is a block diagram illustrating physical components of a computer 500 used as part or all of the network system 130, user client device 100, or provider client device 110 from FIG. 1, in accordance with an embodiment. Illustrated are at least one processor 502 coupled to a chipset 504. Also coupled to the chipset 504 are a memory 506, a storage device 508, a graphics adapter 512, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is any non-transitory computer-readable storage medium, such as a hard drive, compact disk read-only memory (CD-ROM), DVD, or a solid-state memory device. The memory 506 holds instructions and data used by the processor 502. The graphics adapter 512 displays images and other information on the display 518. The network adapter 516 couples the computer 500 to a local or wide area network.

As is known in the art, a computer 500 can have different and/or other components than those shown in FIG. 5. In addition, the computer 500 can lack certain illustrated components. In one embodiment, a computer 500, such as a host or smartphone, may lack a graphics adapter 512, and/or display 518, as well as a keyboard 510 or external pointing device 514. Moreover, the storage device 508 can be local and/or remote from the computer 500 (such as embodied within a storage area network (SAN)).

As is known in the art, the computer 500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502.

The foregoing description described one embodiment of the invention in which a user and a provider associated with a service may communicate in a mutual AR session. In other embodiments, the network system 130 can employ a similar method to enable mutual AR sessions between two or more other users of the network system 130 participating in a common experience. For example, a user wishing to participate in a service with other users may initiate a mutual AR session to share his current location and/or destination location and/or to request the current locations and/or destination locations of nearby users to identify one or more other users traveling to similar locations. As another example, a recipient of a courier service may initiate a mutual AR session with a courier and exchange AR elements associated with the delivery (e.g., the recipient may send an AR location marker indicating the delivery location or may select AR elements associated with payment for the courier service (e.g., to tip the courier)).

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe embodiments in terms of algorithms and symbolic representations of operations on information. These algorithmic descriptions and representations are commonly used by those skilled in the data processing arts to convey the substance of their work effectively to others skilled in the art. These operations while described functionally computationally or logically are understood to be implemented by computer programs or equivalent electrical circuits microcode or the like. Furthermore, it has also proven convenient at times to refer to these arrangements of operations as modules without loss of generality. The described operations and their associated modules may be embodied in software firmware hardware or any combinations thereof.

Any of the steps operations or processes described herein may be performed or implemented with one or more hardware or software modules alone or in combination with other devices. In one embodiment a software module is implemented with a computer program product comprising a computer-readable medium containing computer program code which can be executed by a computer processor for performing any or all of the steps operations or processes described.

Embodiments may also relate to an apparatus for performing the operations herein. This apparatus may be specially constructed for the required purposes and/or it may comprise a general-purpose computing device selectively activated or reconfigured by a computer program stored in the computer. Such a computer program may be stored in a non-transitory tangible computer readable storage medium or any type of media suitable for storing electronic instructions which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process where the information is stored on a non-transitory tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description but rather by any claims that issue on an application based hereon. Accordingly, the disclosure of the embodiments of the invention is intended to be illustrative but not limiting of the scope of the invention which is set forth in the following claims.

The invention claimed is:

1. A computer-implemented method for providing a mutual augmented reality experience, the method comprising:
   receiving periodic location information from a client device associated with a provider of a transportation service and a client device associated with a user of the service;
   determining that the provider client device and the user client device are within a threshold distance of each other;
   responsive to the provider client device being within the threshold distance of the user client device, instructing each of the provider client device and the user client device to trigger a mutual augmented reality session by:

initiating a live video feed captured by a camera on the respective device; and augmenting the live video feed with augmented reality elements associated with the transportation service, the augmented reality elements including a first augmented reality element;

receiving an indication of user-selection or provider-selection of the first augmented reality element at the respective client device; and opening, responsive to receiving the indication, a communication channel between the provider client device and the user client device, wherein the communication channel is configured to enable the user and the provider to exchange messages and augmented reality elements between their respective client devices.

2. The method of claim 1, wherein the augmented reality elements include an identification of a vehicle associated with the provider.

3. The method of claim 1, wherein the augmented reality elements include an identification of a pickup location associated with the transportation service.

4. The method of claim 1, further comprising:
using image recognition to monitor the live video feed on the user client device;
comparing characteristics of an approaching vehicle with provider information to determine a vehicle score; and
responsive to the vehicle score exceeding a vehicle score threshold, determining that the approaching vehicle is the provider's vehicle.

5. The method of claim 1, wherein the augmented reality elements include one or more of images, video, text, and graphics.

6. The method of claim 1, wherein the augmented reality elements include an icon allowing the user or provider to initiate a messaging session.

7. The method of claim 1, further comprising:
receiving user input from a first one of the user client device and the provider client device, the user input comprising an instruction to display one or more additional augmented reality elements; and
sending the one or more additional augmented reality elements for display on the first one of the user client device and the provider client device.

8. The method of claim 1, further comprising:
receiving user input from a first one of the user client device and the provider client device, the user input comprising an instruction to display one or more additional augmented reality elements; and
sending the one or more additional augmented reality elements for display on a second one of the user client device and the provider client device.

9. A non-transitory computer-readable storage medium storing computer-executable instructions that, in response to executing, cause a device comprising a processor to perform operations, comprising:
receiving periodic location information from a client device associated with a provider of a transportation service and a client device associated with a user of the service;
determining that the provider client device and the user client device are within a threshold distance of each other;
responsive to the provider client device being within the threshold distance of the user client device, instructing each of the provider client device and the user client device to trigger a mutual augmented reality session by:
initiating a live video feed captured by a camera on the respective device; and
augmenting the live video feed with augmented reality elements associated with the transportation service, the augmented reality elements including a first augmented reality element;
receiving an indication of user-selection or provider-selection of the first augmented reality element at the respective client device; and
opening, responsive to receiving the indication, a communication channel between the provider client device and the user client device, wherein the communication channel is configured to enable the user and the provider to exchange messages and augmented reality elements between their respective client devices.

10. The non-transitory computer-readable storage medium of claim 9, wherein the augmented reality elements include an identification of a vehicle associated with the provider.

11. The non-transitory computer-readable storage medium of claim 9, wherein the augmented reality elements include an identification of a pickup location associated with the transportation service.

12. The non-transitory computer-readable storage medium of claim 9, further comprising:
using image recognition to monitor the live video feed on the user client device;
comparing characteristics of an approaching vehicle with provider information to determine a vehicle score; and
responsive to the vehicle score exceeding a vehicle score threshold, determining that the approaching vehicle is the provider's vehicle.

13. The non-transitory computer-readable storage medium of claim 9, wherein the augmented reality elements include one or more of images, video, text, and graphics.

14. The non-transitory computer-readable storage medium of claim 9, wherein the augmented reality elements include an icon allowing the user or provider to initiate a messaging session.

15. The non-transitory computer-readable storage medium of claim 9, further comprising:
receiving user input from a first one of the user client device and the provider client device, the user input comprising an instruction to display one or more additional augmented reality elements; and
sending the one or more additional augmented reality elements for display on the first one of the user client device and the provider client device.

16. The non-transitory computer-readable storage medium of claim 9, further comprising:
receiving user input from a first one of the user client device and the provider client device, the user input comprising an instruction to display one or more additional augmented reality elements; and
sending the one or more additional augmented reality elements for display on a second one of the user client device and the provider client device.

17. A computer system comprising:
one or more computer processors for executing computer program instructions; and
a non-transitory computer-readable storage medium storing instructions executable by the one or more computer processors to perform steps comprising:
receiving periodic location information from a client device associated with a provider of a transportation service and a client device associated with a user of the service;

determining that the provider client device and the user client device are within a threshold distance of each other;
responsive to the provider client device being within the threshold distance of the user client device, instructing each of the provider client device and the user client device to trigger a mutual augmented reality session by:
  initiating a live video feed captured by a camera on the respective device; and
  augmenting the live video feed with augmented reality elements associated with the transportation service, the augmented reality elements including a first augmented reality element;
receiving an indication of user-selection or provider-selection of the first augmented reality element at the respective client device; and
opening, responsive to receiving the indication, a communication channel between the provider client device and the user client device, wherein the communication channel is configured to enable the user and the provider to exchange messages and augmented reality elements between their respective client devices.

18. The computer system of claim 17, wherein the augmented reality elements include an identification of a vehicle associated with the provider.

19. The computer system of claim 17, wherein the augmented reality elements include an identification of a pickup location associated with the transportation service.

20. The computer system of claim 17, further comprising:
  using image recognition to monitor the live video feed on the user client device;
  comparing characteristics of an approaching vehicle with provider information to determine a vehicle score; and
  responsive to the vehicle score exceeding a vehicle score threshold, determining that the approaching vehicle is the provider's vehicle.

* * * * *